United States Patent
Jain et al.

(10) Patent No.: US 10,309,315 B2
(45) Date of Patent: *Jun. 4, 2019

(54) VARIABLE AREA NOZZLE ASSISTED GAS TURBINE ENGINE RESTARTING

(71) Applicant: United Technologies Corporation, Hartford, CT (US)

(72) Inventors: Ashok K. Jain, Tempe, AZ (US); Michael Winter, New Haven, CT (US)

(73) Assignee: United Technologies Corporation, Farmington, CT (US)

( * ) Notice: Subject to any disclaimer, the term of this patent is extended or adjusted under 35 U.S.C. 154(b) by 687 days.

This patent is subject to a terminal disclaimer.

(21) Appl. No.: 15/083,752

(22) Filed: Mar. 29, 2016

(65) Prior Publication Data
US 2016/0290239 A1    Oct. 6, 2016

Related U.S. Application Data

(63) Continuation of application No. 12/441,756, filed as application No. PCT/US2006/039943 on Oct. 12, 2006, now Pat. No. 9,328,666.

(51) Int. Cl.
*F02C 7/262*   (2006.01)
*F02K 1/12*    (2006.01)
(Continued)

(52) U.S. Cl.
CPC ............ *F02C 7/262* (2013.01); *F01D 25/24* (2013.01); *F02C 9/16* (2013.01); *F02K 1/06* (2013.01);
(Continued)

(58) Field of Classification Search
CPC .......... F02K 1/1207; F02K 1/15; F02K 3/075; F02K 1/06; F02C 7/262; F02C 9/16; F05D 2260/85; F05D 2270/092; F01D 25/24
See application file for complete search history.

(56) References Cited

U.S. PATENT DOCUMENTS 3,287,906 A   11/1966   McCormick
3,659,422 A    5/1972   Hope
(Continued)

FOREIGN PATENT DOCUMENTS

GB   1516041       6/1978
GB   2041090       9/1980
WO   2007038674    4/2007

OTHER PUBLICATIONS

Conference on Engineering and Physics: Synergy for Success 2006. Journal of Physics: Conference Series vol. 105. London, UK. Oct. 5, 2006.
(Continued)

*Primary Examiner* — Craig Kim
(74) *Attorney, Agent, or Firm* — Carlson, Gaskey & Olds, P.C.

(57) ABSTRACT

An example turbofan engine starting system includes a core nacelle housing a compressor and a turbine. The core nacelle is disposed within a fan nacelle. The fan nacelle includes a turbofan. A bypass flow path downstream from the turbofan is arranged between the two nacelles. A controller is programmed to manipulate the nozzle exit area to facilitate startup of the engine. In one example, manipulates the nozzle exit area using nozzles, in response to an engine shutdown condition. The nozzles open and close to adjust the nozzle exit area.

18 Claims, 3 Drawing Sheets

(51) Int. Cl.
  *F02K 1/15* (2006.01)
  *F02K 3/075* (2006.01)
  *F01D 25/24* (2006.01)
  *F02C 9/16* (2006.01)
  *F02K 1/06* (2006.01)

(52) U.S. Cl.
  CPC .............. *F02K 1/1207* (2013.01); *F02K 1/15* (2013.01); *F02K 3/075* (2013.01); *F05D 2220/32* (2013.01); *F05D 2260/85* (2013.01); *F05D 2270/092* (2013.01)

(56) References Cited

U.S. PATENT DOCUMENTS

| | | | |
|---|---|---|---|
| 3,688,504 | A | 9/1972 | Hutchinson et al. |
| 3,754,484 | A | 8/1973 | Roberts |
| 3,892,358 | A | 7/1975 | Gisslen |
| 3,937,013 | A | 2/1976 | Aspinwall |
| 3,964,257 | A | 6/1976 | Lardellier |
| 4,060,981 | A | 12/1977 | Hampton |
| 4,062,185 | A | 12/1977 | Snow |
| 4,130,872 | A | 12/1978 | Harloff |
| 4,275,560 | A | 6/1981 | Wright et al. |
| 4,292,802 | A | 10/1981 | Snow |
| 5,161,369 | A | 11/1992 | Williams |
| 5,363,641 | A | 11/1994 | Dixon et al. |
| 5,433,674 | A | 7/1995 | Sheridan et al. |
| 5,447,411 | A | 9/1995 | Curley et al. |
| 5,524,847 | A | 6/1996 | Brodell et al. |
| 5,778,659 | A | 7/1998 | Duesler et al. |
| 5,822,975 | A | 10/1998 | Guyonnet et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,223,616 | B1 | 5/2001 | Sheridan |
| 6,318,070 | B1 * | 11/2001 | Rey ...................... F02K 1/1207 239/265.19 |
| 6,813,877 | B2 | 11/2004 | Birch et al. |
| 6,814,541 | B2 | 11/2004 | Evans et al. |
| 6,820,410 | B2 | 11/2004 | Lair |
| 7,021,042 | B2 | 4/2006 | Law |
| 7,578,132 | B2 | 8/2009 | Webster |
| 7,591,754 | B2 | 9/2009 | Duong et al. |
| 7,824,305 | B2 | 11/2010 | Duong et al. |
| 7,926,260 | B2 | 4/2011 | Sheridan et al. |
| 8,205,432 | B2 | 6/2012 | Sheridan |
| 9,328,666 | B2 * | 5/2016 | Jain .......................... F02C 7/262 |
| 2005/0166575 | A1 | 8/2005 | Birch et al. |
| 2010/0148396 | A1 | 6/2010 | Xie et al. |
| 2010/0331139 | A1 | 12/2010 | McCune |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

(56) References Cited

OTHER PUBLICATIONS

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines-Turbofan. Feb. 8, 2012.
Ivchenko-Progress AI-727M. Jane's Aero-engines, Aero-engines-Turbofan. Nov. 27, 2011.
Ivchenko-Progress D-727. Jane's Aero-engines, Aero-engines-Turbofan. Feb. 7, 2007.
Turbomeca Aubisque. Jane's Aero-engines, Aero-engines-Turbofan. Nov. 2, 2009.
Aviadvigatel D-110. Jane's Aero-engines, Aero-engines-Turbofan. Jun. 1, 2010.
Rolls-Royce M45H. Jane's Aero-engines, Aero-engines-Turbofan. Feb. 24, 2010.
Honeywell LF502. Jane's Aero-engines, Aero-engines-Turbofan. Feb. 9, 2012.
Honeywell LF507. Jane's Aero-engines, Aero-engines-Turbofan. Feb. 9, 2012.
Honeywell TFE731. Jane's Aero-engines, Aero-engines-Turbofan. Jul. 18, 2012.
Search Report and Written Opinion dated Nov. 7, 2007 for PCT/US2006/039943.
Notification of Transmittal of the International Preliminary Report on Patentability dated Dec. 18, 2008 for PCT/US2006/039943.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.

* cited by examiner

VARIABLE AREA NOZZLE ASSISTED GAS TURBINE ENGINE RESTARTING

CROSS-REFERENCE TO RELATED APPLICATIONS

This application is a continuation of U.S. patent application Ser. No. 12/441,756 filed on 18 Mar. 2009, which is a National Stage Entry of PCT Application No. PCT/US06/39943 filed on 12 Oct. 2006. Both of these applications are incorporated herein by reference.

BACKGROUND

This disclosure relates to starting gas turbine engines, and, more particularly, to facilitating gas turbofan engine restarts by effectively altering the nozzle exit area.

Gas turbine engines are widely known and used for power generation and vehicle (e.g., aircraft) propulsion. During in-flight propulsion of a multi-engine aircraft, certain problems may occur with one or more engines causing the engine to shut down. For example, inclement weather, non-optimum trimming of engine idle, fuel nozzle coking, fuel contamination, loss of electric power, fuel mismanagement, pilot error, or the like may, under certain conditions, warrant voluntary or automatic shut down of an engine. Although the remaining engines can typically fly the aircraft, it is ordinarily desired to restart the shut down engine while the aircraft is still in-flight.

An engine restart envelope includes combinations of aircraft altitude and airspeed that provide a suitable air supply to the engine sufficient for restarting. When traveling outside of the engine restart envelope, the air supply to the engine may not contain sufficient air to support combustion during ignition. In some instances, starter-assistance may be used to increase the rotational speed of a fan section of the engine, which increases altitude and airspeed combinations suitable for restarting the engine. Increasing the rotational speed of the fan section draws additional airflow into the engine and, in so doing, augments the supply of air supporting combustion.

Disadvantageously, at certain combinations of altitude and airspeed, increasing the rotational speed of the fan section is not alone sufficient to generate adequate airflow to support combustion. As a result, aircraft experiencing in-flight shutdown may have to rapidly adjust altitude and/or airspeed to move within the engine restart envelope or starter-assisted engine restart envelope. As an example, if an engine requires restart in aircraft traveling at an altitude unsuitable for engine restarts, the aircraft may rapidly decrease elevation to move to an altitude suitable for restarting the turbofan engine. Alternatively, the aircraft may be forced to continue flying, without propulsion from the shutdown engine.

SUMMARY

A turbofan engine restarting system, according to an exemplary aspect of the present disclosure includes, among other things, a core nacelle housing a compressor and a turbine, a fan nacelle housing a fan section that is arranged upstream from the core nacelle, a bypass flow path downstream from the fan section and arranged between the core and fan nacelles, the bypass flow path including an effective nozzle exit area that defines an axis, a controller programmed to selectively increase and decrease the effective nozzle exit area to facilitate restart of the engine during flight in air. The effective nozzle area is increased when the nozzle effective area is not a maximum effective nozzle area, and a starter for increasing a rotational speed of the fan section, and a control device arranged to receive a command from the controller in response to an engine condition. The control device changing the effective nozzle exit area provided between the core and fan nacelles in response to the command.

In another example of the foregoing system, a plurality of flaps are arranged about the axis, the controller initiates movement of at least some of the flaps radially away from the axis and from a position suitable for aircraft cruising operations to increase the effective nozzle exit area, and initiates movement of at least some of the flaps radially toward the axis to decrease the effective nozzle exit area.

In another example of any of the foregoing systems, the increase occurs when the effective nozzle exit area of the bypass flow path is not a maximum effective nozzle exit area of the bypass flowpath.

In another example of any of the foregoing systems, the control device increases or decreases the effective nozzle exit area in response to the command.

In another example of any of the foregoing systems, the control device increases a mass flow rate of air through the bypass flow path.

In another example of any of the foregoing systems, an increased mass flow rate of air through the bypass flow path increases a windmilling speed of the fan section.

In another example of any of the foregoing systems, the system includes a driver for initiation by an aircraft operator and in communication with the controller, the controller sending the command in response to actuation of the driver.

In another example of any of the foregoing systems, the engine condition includes a rotational speed of a portion of the engine.

In another example of any of the foregoing systems, the system includes at least one nozzle flap disposed on the fan nacelle operative to control the effective nozzle exit area.

A method of restarting a turbofan engine according to another exemplary aspect of the present disclosure includes, among other things, a) detecting a shutdown of a turbofan engine during flight in air, selectively increasing and decreasing an effective nozzle exit area from a bypass flow path within the engine in response to the shutdown during a flight in air to establish a desired condition for a startup of the engine during the flight in air, the increasing and decreasing achieved by changing a physical area of an exit nozzle, the exit nozzle provided by a turbofan nacelle surrounding a fan section and a core nacelle, and c) increasing the rotational speed of a fan section of the engine using a starter.

In another example of the foregoing method, a controller commands a control device to change the effective nozzle exit area.

In another example of any of the foregoing methods, the controller commands the control device based on a rotational speed of a rotor.

In another example of any of the foregoing methods, the controller commands the control device based on at least one of an airflow rate or an air pressure within the engine.

In another example of any of the foregoing methods, the step (b) includes increasing the effective nozzle exit area to increase a rotational speed of a rotor within the engine.

In another example of any of the foregoing methods, the step (b) includes decreasing the effective nozzle exit area to increase a mass flow rate of air through a portion of the engine.

In another example of any of the foregoing methods, the step (b) includes increasing the effective nozzle exit area and then decreasing the effective nozzle exit area to the increase mass flow rate of air through a portion of the engine.

In another example of any of the foregoing methods, the method includes selectively increasing combinations of altitude and airspeed suitable for restarting the turbofan engine.

In another example of any of the foregoing methods, the increasing occurs when the effective nozzle exit area of the bypass flow path is not a maximum effective nozzle exit area of the bypass flowpath.

These and other features of the present disclosure can be best understood from the following specification and drawings, the following of which is a brief description.

BRIEF DESCRIPTION OF THE DRAWINGS

The various features and advantages of this disclosure will become apparent to those skilled in the art from the following detailed description of the currently preferred embodiment. The drawings that accompany the detailed description can be briefly described as follows.

DETAILED DESCRIPTION

Figure 1:
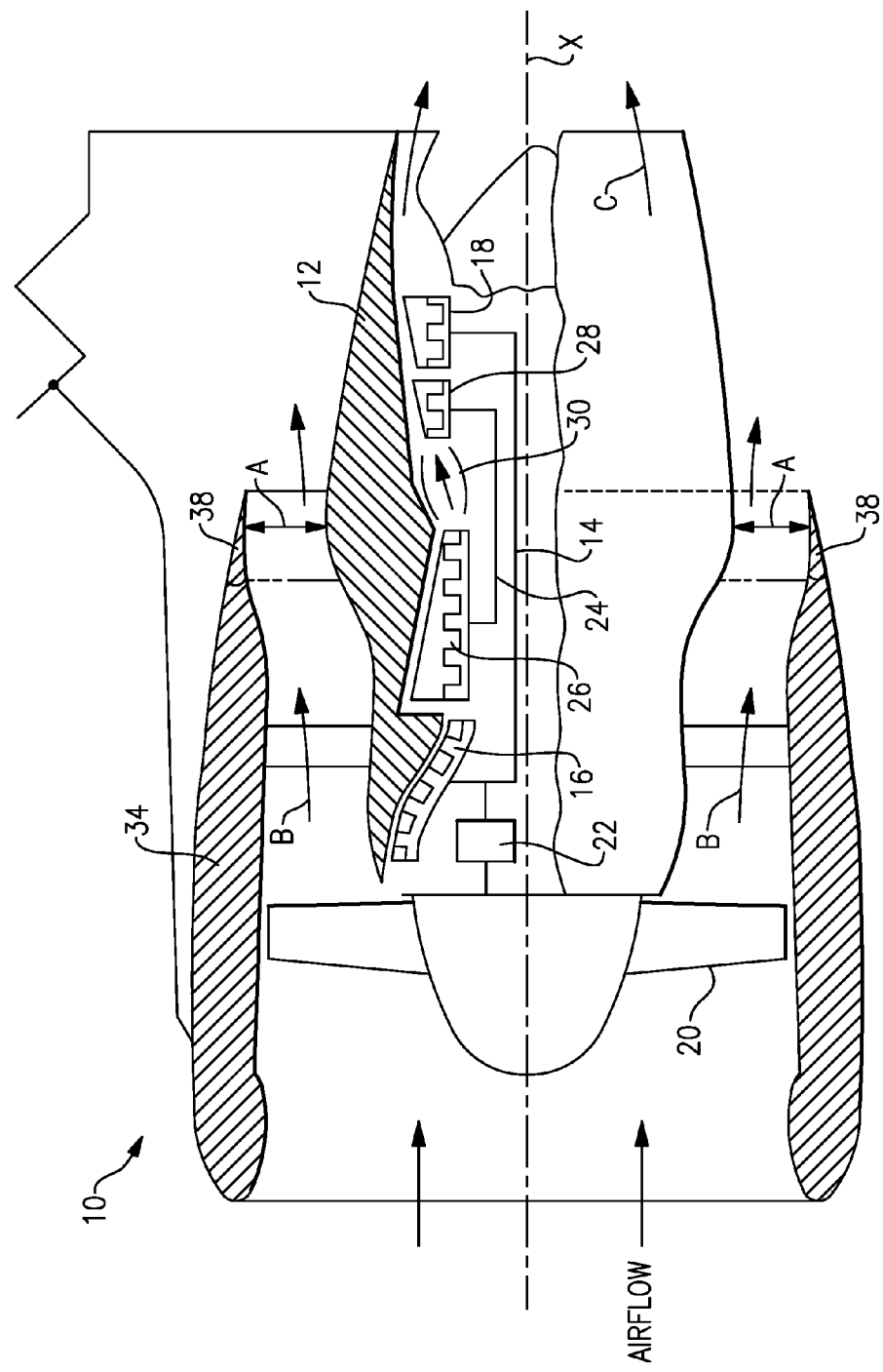
FIG. 1 illustrates selected portions of an example gas turbine engine system.

A geared turbofan engine 10 is shown in FIG. 1. The engine 10 includes a core nacelle 12 that houses a low rotor 14 and high rotor 24. The low rotor 14 supports a low pressure compressor 16 and low pressure turbine 18. In this example, the low rotor 14 drives a fan section 20 through a gear train 22. The high rotor 24 rotationally supports a high pressure compressor 26 and high pressure turbine 28. A combustor 30 is arranged between the high pressure compressor 26 and high pressure turbine 28. The low and high rotors 14, 24 rotate about an axis X. At least a portion of the core nacelle 12 is disposed within a fan nacelle 34.

In the examples shown, the engine 10 is a high bypass turbofan arrangement. In one example, the bypass ratio is greater than 10, and the fan section diameter 20 is substantially larger than the diameter of the low pressure compressor 16. The low pressure turbine 18 has a pressure ratio that is greater than 5, in one example. The gear train 22 can be any known suitable gear system, such as a planetary gear system with orbiting planet gears, planetary system with non-orbiting planet gears, or other type of gear system. It should be understood, however, that the above parameters are only exemplary of a contemplated geared turbofan engine. That is, the examples of this disclosure are applicable to other types of engines.

For the engine 10 shown FIG. 1, a significant amount of thrust may be provided by a bypass flow B due to the high bypass ratio. Thrust is a function of density, velocity, and area. One or more of these parameters can be manipulated to vary the amount and direction of thrust provided by the bypass flow B. A core flow C communicates from the core nacelle 12. In one example, the engine 10 includes a nozzle structure 38 associated with the nozzle exit area A to change the physical area and geometry to manipulate the thrust provided by the bypass flow B. However, it should be understood that the nozzle exit area A may be effectively altered by other than structural changes, for example, by altering a boundary layer of the bypass flow B. Furthermore, it should be understood that effectively altering the nozzle exit area A is not limited to physical locations approximate to the exit of the fan nacelle 34, but rather, includes altering the bypass flow B by any suitable means at any suitable location of the fan section 20.

Figure 2:
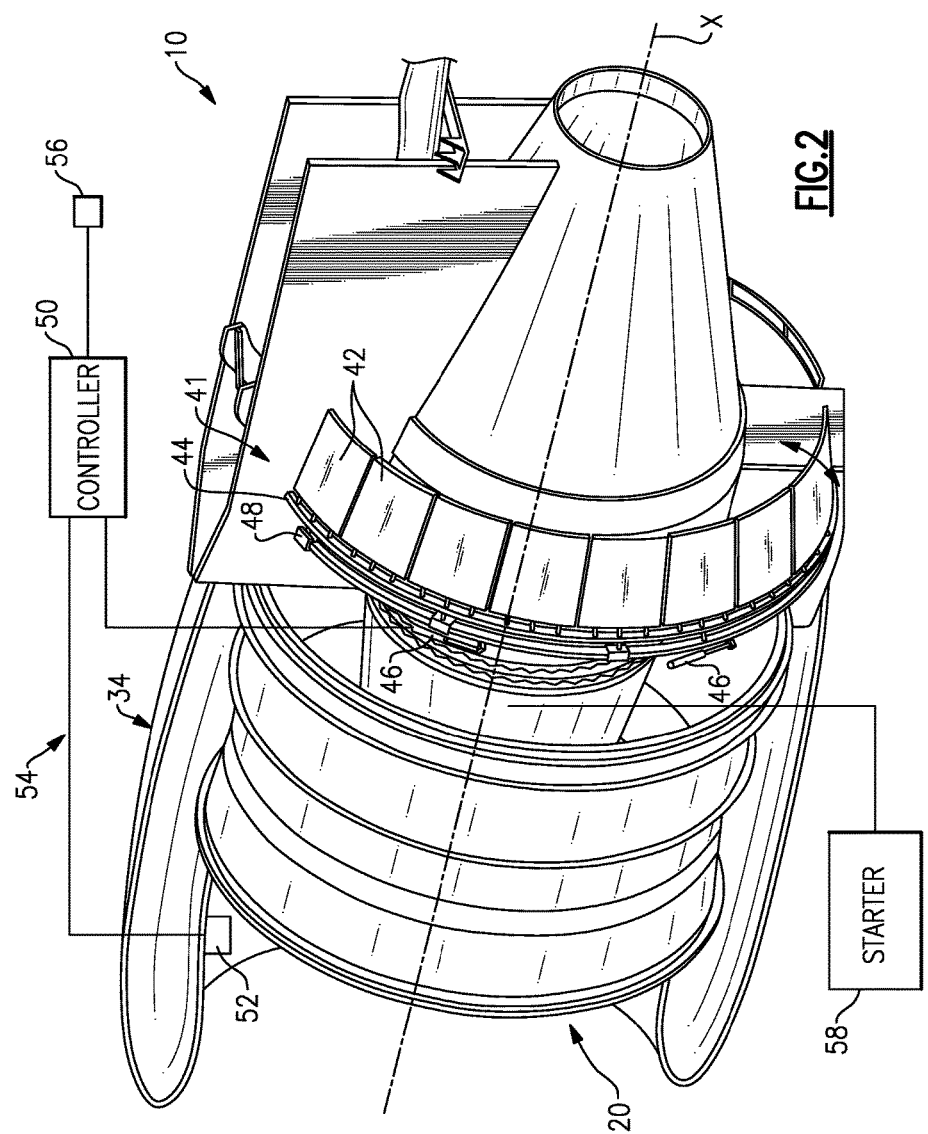
FIG. 2 illustrates a variable air nozzle and coolant passage within the gas turbine engine system shown in FIG. 1.

In the example shown in FIG. 2, an engine restart system 54 includes multiple hinged flaps 42 arranged circumferentially about the rear of the fan nacelle 34. The hinged flaps 42 form a portion of a control device 41, which further includes a controller 50 in communication with actuators 46 used to manipulate the hinged flaps 42. A detector 52 communicates information about the engine 10 to the controller 50, for example, information that the engine 10 has shut down or relating to the startup state of the engine 10. In one example, the detector 52 monitors the rotational speed of the low rotor 14, which is indicative of the state of the engine 10. The controller 50 interprets rotational speeds of the low rotor 14 below a certain level as a condition of the engine 10 indicting the engine 10 has shut down. In another example, the detector 52 monitors fuel consumption of the engine 10. If the engine 10 experiences a drop in fuel consumption, the detector 52 communicates this information to the controller 50, which interprets the information as a shutdown of the engine 10. The detector 52 may be located proximate or apart from the engine 10. The controller 50 also communicates with a driver 56, which may be controlled by an aircraft operator. Thus, the controller 50 may operate automatically using information from the detector 52, or may operate manually based on signals from the driver 56. A starter 58, such as a hydraulic starter, may be used to boost the rotational speed of the fan section 20.

The hinged flaps 42 can be actuated independently and/or in groups using segments 44. The segments 44 and individual hinged flaps 42 can be moved angularly using actuators 46. The control device 41 thereby varies the nozzle exit area A (FIG. 1) between the hinged flaps 42 and the engine 10 by altering positions of the hinged flaps 42. In a closed position, the hinged flap 42 is closer to the core nacelle 12 for a relatively smaller nozzle exit area A. In an open position, the hinged flap 42 is farther away from the core nacelle 12 for a relatively larger nozzle exit area A.

When the engine 10 shuts down during flight, the fan section 20 will continue to rotate, or windmill, as the engine 10 moves, either by gliding or powered by additional engines. Restarting the engine 10 requires adequate compressed air to support combustion. Changing the nozzle exit area A influences the mass flow rate of airflow over the fan section 20 as a function of radial distance from the axis X. For example, increasing the size of the nozzle exit area A increases the bypass flow B and the core flow C. The increased mass flow rate exerts more force on the fan section 20 to accelerate rotation of the fan section 20. Thus, by controlling bypass flow B and the core flow C the rotational speed of the fan section 20 is controlled.

As an example, it is estimated that moving the hinged flaps 42 from a location suitable for aircraft cruising operations to an open position increases the windmilling speed of the fan section 20 about 10-20%. Increasing the windmilling speed of the fan section 20 also increases the rotational speed of the low rotor 14, the low speed compressor 16, and the low pressure turbine 18.

Rotational inertia of the fan section 20 forces airflow into the core nacelle 12. The rotational inertia also contributes to rotating the low pressure compressor 16, which compresses air in preparation for ignition.

In an example method of restarting the engine 10, communications from the controller 50 open the hinged flaps 42 to maximize the windmilling speed of the rotating fan section 20, which also increases the rotational speed of the low rotor 14. Next, communications from the controller 50 initiate ignition of the engine 10. The controller 50 then readjusts the nozzle exit area A. Rotational inertia in the windmilling fan section 20 helps to compress airflow through the core nacelle 12. Actuating the hinged flaps 42 in this way during the engine 10 restart increases the combinations of altitudes and airspeeds suitable for restarting the engine 10. After reaching a sufficient level of compressed air, fuel flow is introduced to the compressed air, and the mixture is ignited, thereby restarting the engine 10.

Figure 3:
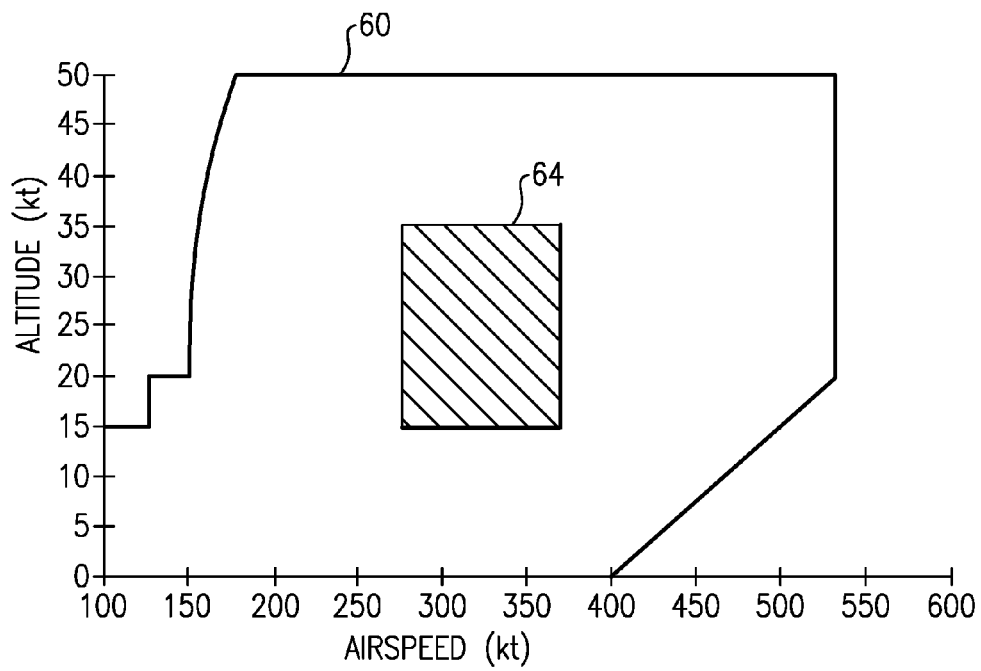
FIG. 3 illustrates an example turbofan engine restart envelope without assistance from a variable area nozzle.
Figure 4:
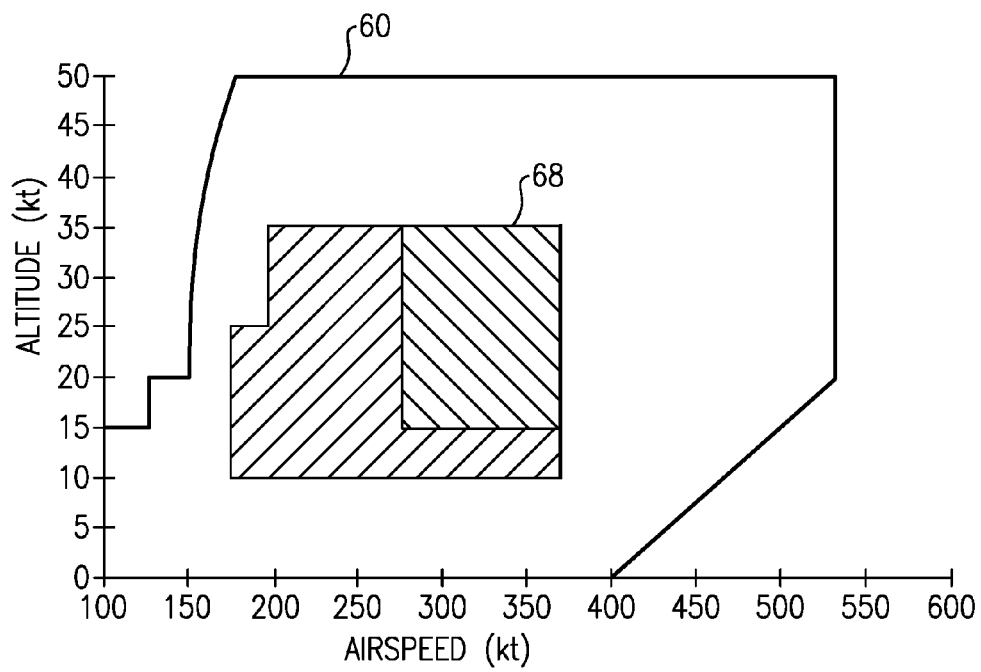
FIG. 4 illustrates an example turbofan engine restart envelope with assistance from a variable area nozzle.

Referring now to FIG. 3 with continued reference to FIG. 1, illustrated is a typical flight envelope 60 for the engine 10, that is, those combinations of altitude and airspeed suitable for operating the engine 10. Within the flight envelope 60, an area 64 represents combinations of altitude and speed suitable for restarting the engine without effectively altering the nozzle exit area A. FIG. 4 represents an increased area 68 illustrating the combinations of altitude and speed suitable for restarting the typical engine when altering the nozzle exit area A. Formerly, the engine 10 may have needed starter assistance to restart at some of the altitudes and speeds included in area 68. Of course, starter assistance may increase the likelihood of restarting the engine 10 at altitudes and airspeeds beyond those included in area 68.

In the disclosed examples, the ability to control the amount of airflow through the nozzle exit area A provides the benefit of restarting the engine 10 while in flight at increased combinations of altitudes and airspeeds. Restarts in prior designs may have required starter assistance for similar restarts. Further, although described in terms of restarts while in the air, adjusting nozzle exit area A (FIG. 1) may also be used to facilitate starting the engine 10 while on the ground.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A turbofan engine restarting system, comprising:
   a core nacelle housing a compressor and a turbine;
   a fan nacelle housing a fan section that is arranged upstream from said core nacelle;
   a bypass flow path downstream from said fan section and arranged between said core and fan nacelles, said bypass flow path including an effective nozzle exit area that defines an axis;
   a controller programmed to selectively increase and decrease said effective nozzle exit area to facilitate restart of said engine during flight in air, wherein said effective nozzle area is increased when said nozzle effective area is not a maximum effective nozzle area;
   a starter for increasing a rotational speed of said fan section; and
   a control device arranged to receive a command from said controller in response to an engine condition, said control device changing said effective nozzle exit area provided between said core and fan nacelles in response to said command.

2. The turbofan engine restarting system of claim 1, wherein a plurality of flaps are arranged about the axis, said controller initiates movement of at least some of said flaps radially away from said axis and from a position suitable for aircraft cruising operations to increase said effective nozzle exit area, and initiates movement of at least some of said flaps radially toward said axis to decrease said effective nozzle exit area.

3. The turbofan engine restarting system of claim 1, wherein the increase occurs when the effective nozzle exit area of the bypass flow path is not a maximum effective nozzle exit area of the bypass flowpath.

4. The turbofan engine restarting system of claim 1, wherein said control device increases or decreases said effective nozzle exit area in response to said command.

5. The turbofan engine restarting system of claim 1, wherein said control device increases a mass flow rate of air through said bypass flow path.

6. The turbofan engine restarting system of claim 1, wherein an increased mass flow rate of air through said bypass flow path increases a windmilling speed of said fan section.

7. The turbofan engine restarting system of claim 1, comprising a driver for initiation by an aircraft operator and in communication with said controller, said controller sending said command in response to actuation of said driver.

8. The turbofan engine restarting system of claim 1, wherein said engine condition includes a rotational speed of a portion of said engine.

9. The turbofan engine restarting system of claim 1, including at least one nozzle flap disposed on said fan nacelle operative to control said effective nozzle exit area.

10. A method of restarting a turbofan engine comprising the steps of:
    a) detecting a shutdown of a turbofan engine during flight in air;
    b) selectively increasing and decreasing an effective nozzle exit area from a bypass flow path within the engine in response to the shutdown during a flight in air to establish a desired condition for a startup of the engine during the flight in air, the increasing and decreasing achieved by changing a physical area of an exit nozzle, the exit nozzle provided by a turbofan nacelle surrounding a fan section and a core nacelle; and
    c) increasing the rotational speed of a fan section of the engine using a starter.

11. The method of restarting a turbofan engine according to claim 10, wherein a controller commands a control device to change the effective nozzle exit area.

12. The method of restarting a turbofan engine according to claim 11, wherein the controller commands the control device based on a rotational speed of a rotor.

13. The method of restarting a turbofan engine according to claim 11, wherein the controller commands the control device based on at least one of an airflow rate or an air pressure within the engine.

14. The method of restarting a turbofan engine according to claim 10, wherein said step (b) includes increasing the effective nozzle exit area to increase a rotational speed of a rotor within the engine.

15. The method of restarting a turbofan engine according to claim 10, wherein said step (b) includes decreasing the effective nozzle exit area to increase a mass flow rate of air through a portion of the engine.

16. The method of restarting a turbofan engine according to claim 10, wherein said step (b) includes increasing the effective nozzle exit area and then decreasing the effective nozzle exit area to the increase mass flow rate of air through a portion of the engine.

17. The method of restarting a turbofan engine according to claim 10, including selectively increasing combinations of altitude and airspeed suitable for restarting the turbofan engine.

18. The method of restarting a turbofan engine according to claim 10, wherein the increasing occurs when the effective nozzle exit area of the bypass flow path is not a maximum effective nozzle exit area of the bypass flowpath.

* * * * *